United States Patent
Chuang et al.

(10) Patent No.: US 7,609,533 B2
(45) Date of Patent: Oct. 27, 2009

(54) LIGHT-LOAD EFFICIENCY IMPROVING METHOD AND APPARATUS FOR A FLYBACK CONVERTER

(75) Inventors: Chao-Hsuan Chuang, Jhubei (TW); Cheng-Hsuan Fan, Hsinchu (TW); Hung-Che Chou, Jiadung Township, Pingtung County (TW)

(73) Assignee: Richtek Technology Corp., Hsinchu (TW)

( * ) Notice: Subject to any disclaimer, the term of this patent is extended or adjusted under 35 U.S.C. 154(b) by 269 days.

(21) Appl. No.: 11/882,637

(22) Filed: Aug. 3, 2007

(65) Prior Publication Data

US 2008/0298095 A1 Dec. 4, 2008

(30) Foreign Application Priority Data

May 29, 2007 (TW) .............................. 96119168 A

(51) Int. Cl.
*H02M 3/335* (2006.01)

(52) U.S. Cl. .......................................... 363/19; 363/97

(58) Field of Classification Search ............. 363/16–20, 363/21.12, 21.18, 21.7, 41, 95, 97, 89, 131; 323/222, 282, 288, 301
See application file for complete search history.

(56) References Cited

U.S. PATENT DOCUMENTS

| 4,757,433 | A | * | 7/1988 | Santelmann, Jr. ............ 363/19 |
| 5,982,639 | A | * | 11/1999 | Balakirshnan ........... 363/21.18 |
| 6,137,696 | A | * | 10/2000 | Hall et al. ................ 363/21.05 |
| 6,356,466 | B1 | * | 3/2002 | Smidt et al. .............. 363/21.17 |
| 6,845,019 | B2 | * | 1/2005 | Kim et al. ................ 363/21.16 |
| 6,961,253 | B1 | * | 11/2005 | Cohen ........................ 363/89 |

* cited by examiner

*Primary Examiner*—Rajnikant B Patel
(74) *Attorney, Agent, or Firm*—Rosenberg, Klein & Lee

(57) ABSTRACT

A flyback converter has a controller to switch a power switch so as to convert an input voltage to an output voltage for a load by monitoring an output voltage dependent signal and a current sensing signal derived from a current flowing through the power switch, a light-load efficiency improving apparatus monitors the load and a supply voltage provided for the controller to selectively clamp the output voltage dependent signal when the load is lower than a first threshold value and the supply voltage is lower than a second threshold value, so as to increase the supply voltage.

7 Claims, 4 Drawing Sheets

LIGHT-LOAD EFFICIENCY IMPROVING METHOD AND APPARATUS FOR A FLYBACK CONVERTER

FIELD OF THE INVENTION

The present invention is related generally to a flyback converter and, more particularly, to a light-load efficiency improving method and apparatus for a flyback converter.

BACKGROUND OF THE INVENTION

As is well known, most of time an AC-DC converter is in light-load or no-load condition such as standby mode and no charged batteries in a charger, and Blue Angel and Energy Star have some regulations to limit the power consumption under such conditions. Therefore, AC-DC switching converters having green mode are widely used in AC-DC power supplies.

FIG. 1 shows a conventional flyback AC-DC converter 100, in which a line voltage VAC is filtered by an EMI filter 102 and rectified by a bridge rectifier 104 to produce an input voltage Vin, a controller 108 switches a power switch SW such that a transformer 106 transforms the input voltage Vin to an output voltage Vo for a load RL, an auxiliary coil Laux of the transformer 106 provides a current Iaux to charge a capacitor C2 to produce a supply voltage Vcc connected to an input VCC of the controller 108, a photocoupler 112 generates a feedback signal FB from the output voltage Vo, an error amplifier 110 determines an error signal VEA connected to a feedback input COMP of the controller 108 by comparing the feedback signal FB with a reference voltage Vref. In the controller 108, an input CS receives a current sensing signal Vcs that is produced by a resistor Rs having the switched current in the power switch SW to flow therethrough, a comparator 116 determines a comparison signal S1 by comparing the error signal VEA with the current sensing signal Vcs, and a control logic 118 generates a pulse width modulation signal PWM to switch the power switch SW according to the comparison signal S1 and a clock CLK provided by an oscillator 114.

When the load RL of the converter 100 becomes light, the output power reduces dramatically, but the power loss in the circuit will not be eliminated, and thus the efficiency is lowered. Under light-load condition, switching loss dominants the power loss, and thus the key to improve the efficiency is to reduce the switching loss. Conventionally, when the converter 100 enters into a green mode, the error signal VEA will vary between two threshold values burst_high and burst_low, and when the error signal VEA is lower than the low threshold value burst_low, the power switch SW is turned on to pull up the error signal VEA until the error signal VEA becomes higher than the high threshold value burst_high.

Although operating with green mode can reduce the switching loss during light-load condition, when the load RL further reduces or even to no load, the controller 108 no longer turns on the power switch SW and thus the auxiliary coil Laux no longer supplies the current Iaux to charge the capacitor C2. Even though there is no power consumption of the power switch SW, the controller 108 still consumes power since its internal circuit always drains current, which lowers the supply voltage Vcc. Because the time constant of the capacitor C2 is much smaller than that of a capacitor C5 on the output Vo, the supply voltage Vcc will falls down to an undervoltage lockout cut-off threshold value UVLO and the converter 100 will enters into a hiccup mode. However, the load RL might suddenly change under the hiccup mode, thus it is better not to operate with a hiccup mode.

FIG. 2 shows a conventional method to prevent the supply voltage Vcc from being lower than the undervoltage lockout cut-off threshold value UVLO by setting a threshold value VCC_L for the supply voltage Vcc. When the supply voltage Vcc falls down to the threshold value VCC_L, the controller 108 will force to turn on the power switch SW to increase the current sensing signal Vcs, as shown by waveforms 200, 202, 204 and 212 of FIG. 2. However, in this circumstance the error signal VEA is nearly zero, and thus a minimum VEA_CLAMP is provided to clamp the error signal VEA, as shown by waveform 210. To prevent error operation during a green mode, the minimum VEA_CLAMP for the error signal VEA must be lower than the threshold values burst_high and burst_low as shown by waveform 206 and 208. By switching the power switch SW in such way, the supply voltage Vcc will remains at some level finally, as shown by the waveform 200. However, the minimum VEA_CLAMP for the error signal VEA must be a constant and lower than the threshold value burst_low during the green mode, and thus there is no enough energy as that during the green mode, resulting in the increase of switching times of the power switch SW and thereby the degradation of efficiency.

Therefore, it is desired a light-load efficiency improving method and apparatus for a flyback converter.

SUMMARY OF THE INVENTION

An object of the present invention is to provide a light-load efficiency improving method and apparatus for a flyback converter.

Another object of the present invention is to provide a light-load efficiency improved flyback converter.

For a flyback converter having a controller to switch a power switch so as to convert an input voltage to an output voltage for a load by monitoring an output voltage dependent signal and a current sensing signal derived from a current flowing through the power switch, according to the present invention, a light-load efficiency improving apparatus comprises a first detecting circuit for detecting the load, a second detecting circuit for detecting a supply voltage provided for the controller, and a circuit for selectively clamping the output voltage dependent signal according to outputs of the first detecting circuit and the second detecting circuit. When the load is detected lower than a first threshold value and the supply voltage is detected lower than a second threshold value, a bias voltage is provided by a voltage source to clamp the output voltage dependent signal at the bias voltage.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAIL DESCRIPTION OF THE INVENTION

Figure 1:
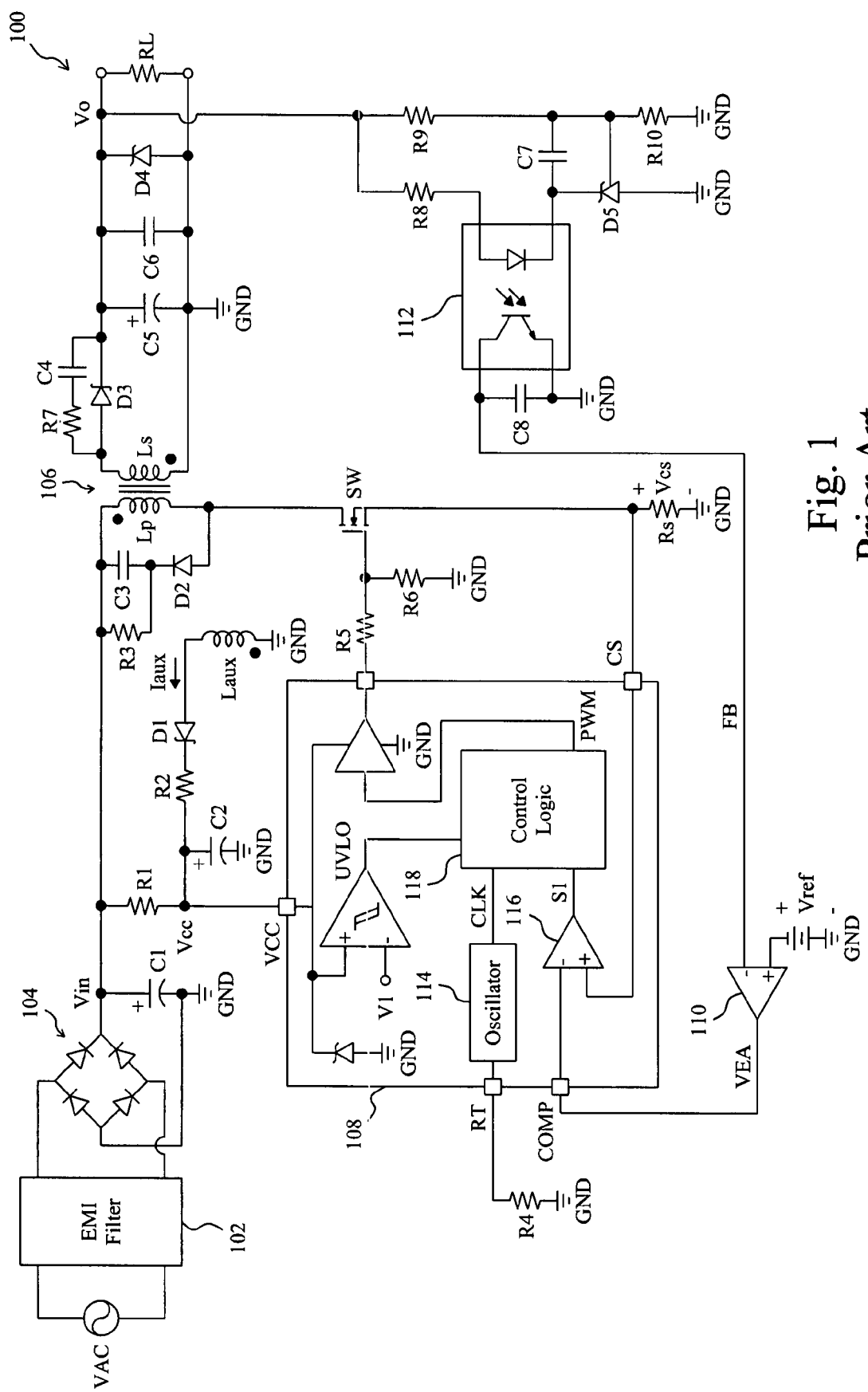
FIG. 1 shows a conventional flyback AC-DC converter.
Figure 2:
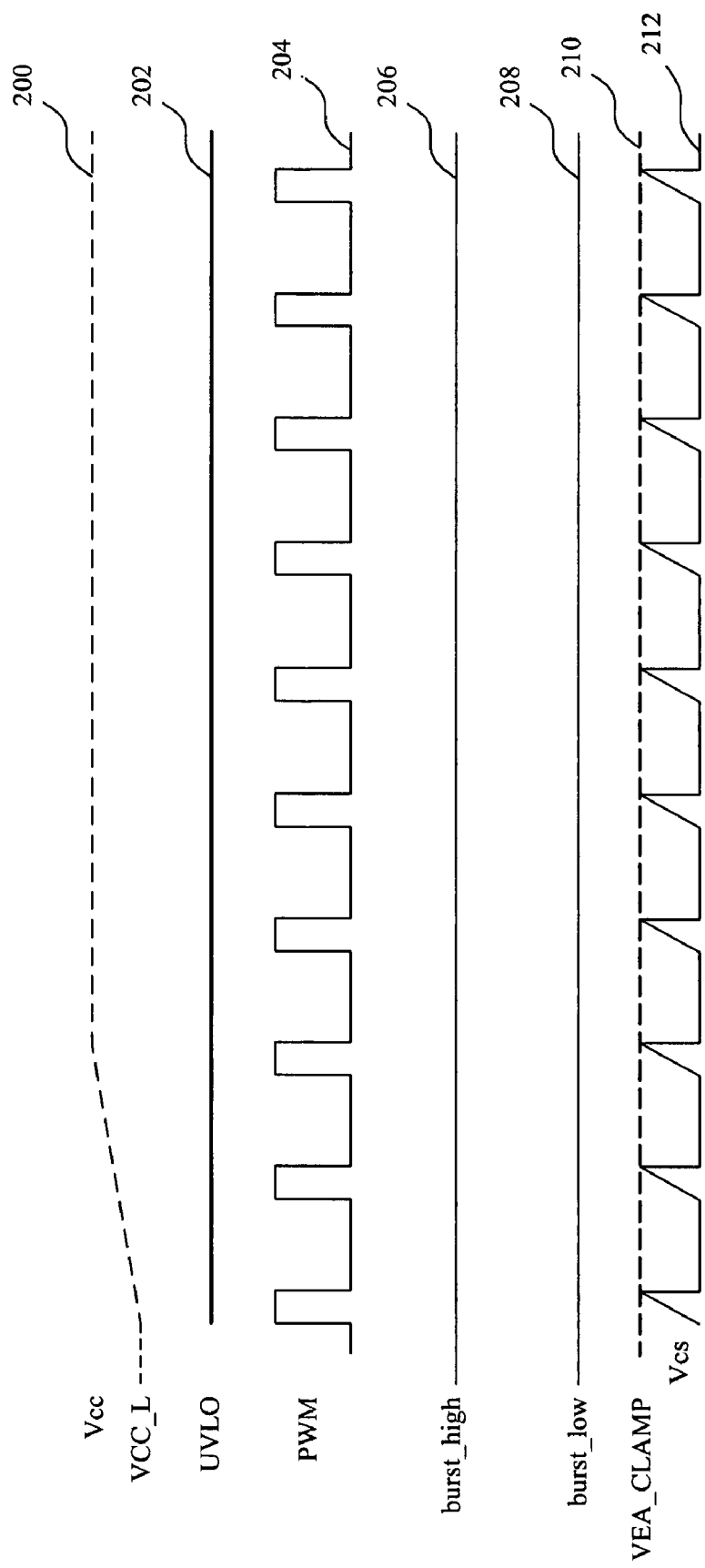
FIG. 2 shows a conventional method to prevent the supply voltage of FIG. 1 from being lower than a undervoltage lockout cut-off threshold value by setting a threshold value for the supply voltage.
Figure 3:
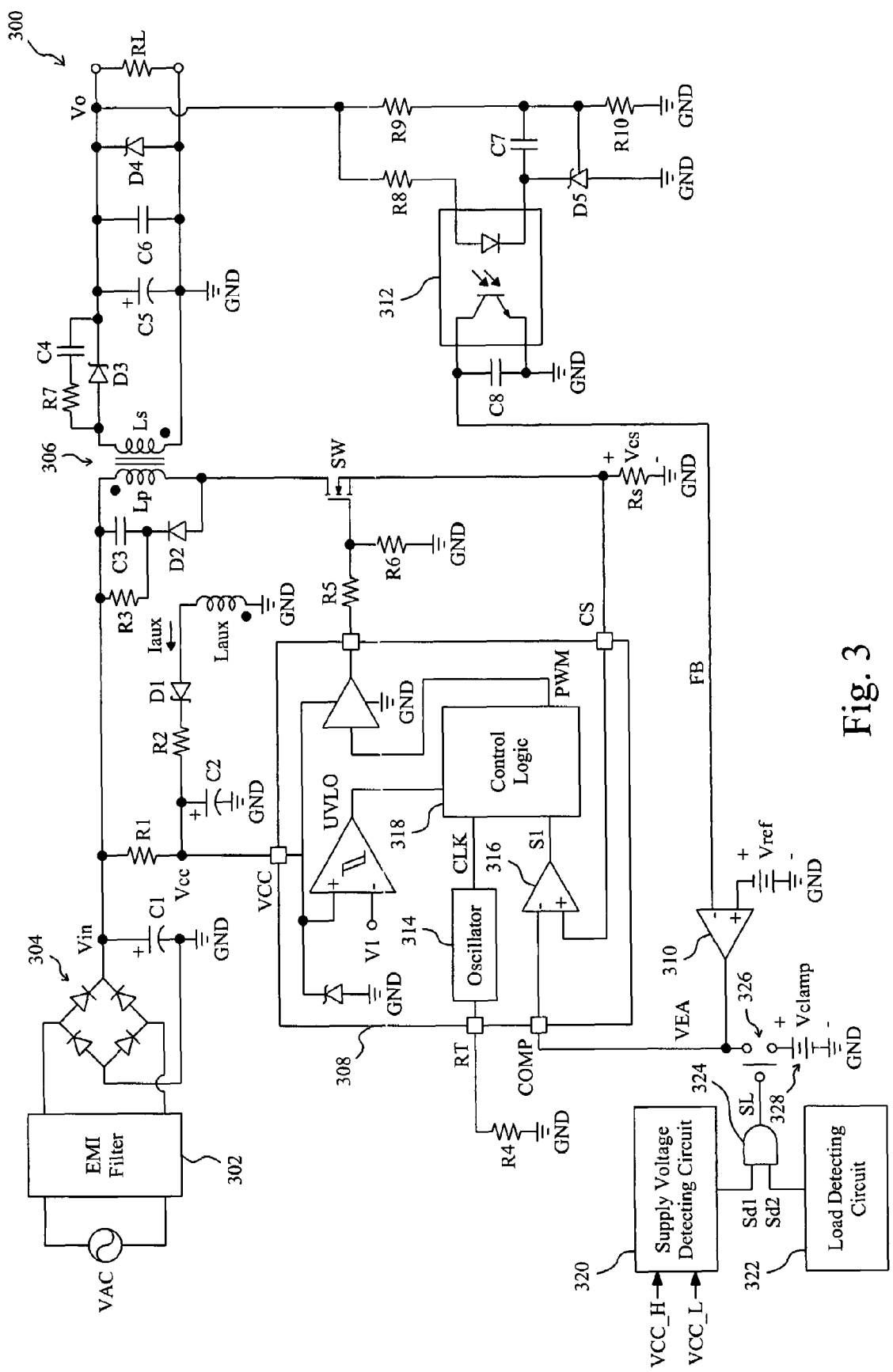
FIG. 3 shows an embodiment according to the present invention.

FIG. 3 shows an embodiment according to the present invention. In a flyback AC-DC converter 300, a line voltage VAC is filtered by an EMI filter 302 and rectified by a bridge rectifier 304 to produce an input voltage Vin, a controller 308 switches a power switch SW such that a transformer 306 transforms the input voltage Vin to an output voltage Vo for a load RL, an auxiliary coil Laux of the transformer 306 provides a current Iaux to charge a capacitor C2 to produce a supply voltage Vcc connected to an input VCC of the controller 308, a photocoupler 312 generates a feedback signal FB by monitoring the output voltage Vo, an error amplifier 310 determines an error signal VEA connected to a feedback input COMP of the controller 308 by comparing the feedback signal FB with a reference voltage Vref, a switch 326 is connected between the output VEA of the error amplifier 310 and a voltage source 328, a supply voltage detecting circuit 320 detects the supply voltage Vcc to provide a detecting signal Sd1, a load detecting circuit 322 detects the load RL to provide a detecting signal Sd2, and an AND gate 324 determines a signal SL to switch the switch 326 according to the detecting signals Sd1 and Sd2. In the controller 308, an input CS receives a current sensing signal Vcs that is derived from a voltage across a resistor Rs serially (connected to the power switch SW, a comparator 316 determines a comparison signal S1 by comparing the signals from the inputs COMP and CS, and a control logic 318 generates a pulse width modulation signal PWM to switch the power switch SW according to the comparison signal S1 and a clock CLK provided by an oscillator 314.

Figure 4:
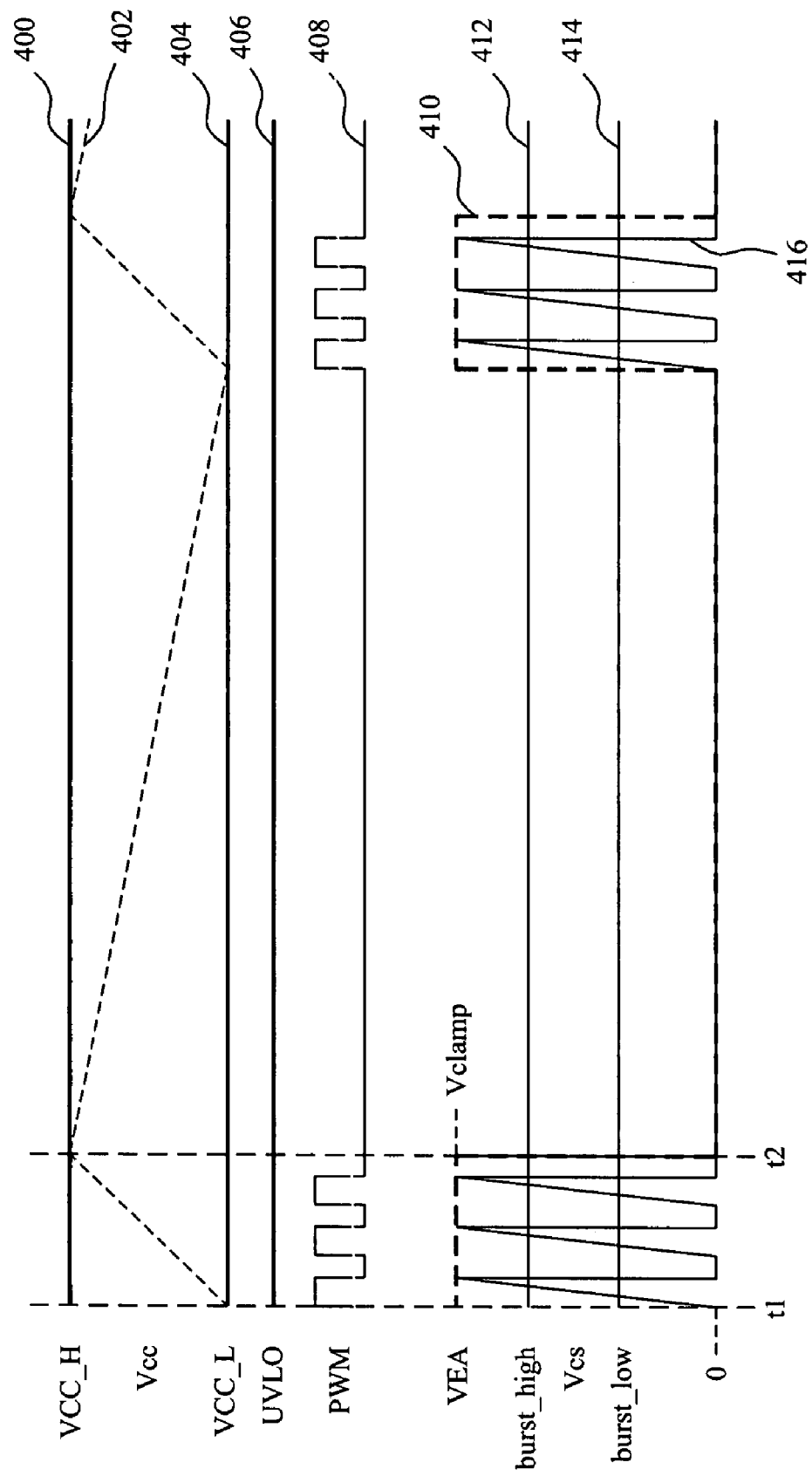
FIG. 4 is a waveform diagram showing various signals of the flyback converter shown in FIG. 3 under a light-load condition.

FIG. 4 is a waveform diagram showing various signals of the flyback converter 300 under a light-load condition, in which waveform 400 represents a hysteresis threshold value VCC_H, waveform 402 represents the supply voltage Vcc, waveform 404 represents a hysteresis threshold value VCC_L, waveform 406 represents an undervoltage lockout cut-off threshold value UVLO, waveform 408 represents the pulse width modulation signal PWM, waveform 410 represents the signal COMP, waveform 412 represents a threshold value burst_high, waveform 414 represents a threshold value burst_low, and waveform 416 represents the current sensing signal Vcs. When the load RL is not lower than a default value, the detecting signal Sd2 at the output of the load detecting circuit 322 is low and thus turns off the switch 326. In this case, the output voltage dependent signal VEA is sole determined by the difference between the feedback signal FB and the reference voltage Vref. When the converter 300 enters into no-load condition such that the supply voltage Vcc falls down continuously, in order for the supply voltage Vcc not lower than an undervoltage lockout cut-off threshold value UVLO, two hysteresis threshold values VCC_H and VCC_L are set correspondingly in this embodiment, as shown by the waveforms 400, 404 and 406 of FIG. 4. When the load RL becomes light and is lower than a threshold value, the detecting signal Sd2 at the output of the load detecting circuit 322 becomes high. When the load RL becomes light, the converter 300 enters into a green mode, and the error signal VEA varies between the threshold values burst_high and burst_low. When the load RL further reduces such that the power switch SW stops switching, the supply voltage Vcc will fall down and the error signal VEA will decrease to nearly zero. When the supply voltage Vcc is lower than the hysteresis threshold value VCC_L at time t1, the detecting signal Sd1 provided by the supply voltage detecting circuit 320 becomes high and turns on the power switch SW. At this moment, since the detecting signals Sd1 and Sd2 are both high and thus the output SL of the AND gate 324 is high so as to turn on the switch 326, a bias voltage Vclamp is provided by the voltage source 328 to clamp the signal COMP at Vclamp as shown by waveform 410. Due to the higher level signal Vclamp at the feedback input COMP, when the power switch SW turns on, there is higher energy to pull up the supply voltage Vcc. When the supply voltage Vcc-rises up to the hysteresis threshold value VCC_H at time t2, the detecting signal Sd1 provided by the supply voltage detecting circuit 320 becomes low, and thus the signal SL produced by the AND gate 324 becomes low and turns off the switch 326. The signal COMP is the error signal VEA and nearly zero, such that the power switch SW stop switching until the supply voltage Vcc falls down to the hysteresis threshold value VCC_L again.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation to encompass all such modifications and similar arrangements.

What is claimed is:

1. A light-load efficiency improving apparatus for a flyback converter which is operative to convert an input voltage to an output voltage for a load by switching a power switch by a controller receiving a supply voltage, an output voltage dependent signal from a feedback input, and a current sensing signal derived from a current flowing through the power switch, the controller turning off the power switch when the output voltage dependent signal is lower than the current sensing signal, the light-load efficiency improving apparatus comprising:
   a first detecting circuit for detecting the load;
   a second detecting circuit for detecting the supply voltage; and
   a circuit for selectively clamping the output voltage dependent signal according to outputs of the first detecting circuit and the second detecting circuit.

2. The light-load efficiency improving apparatus of claim 1, wherein the circuit for selectively clamping the output voltage dependent signal comprises:
   a voltage source for providing a bias voltage; and
   a switch between the voltage source and the feedback input, for being turned on when the load is detected lower than a first threshold value and the supply voltage is detected lower than a second threshold value.

3. A light-load efficiency improving method for a flyback converter which is operative to convert an input voltage to an output voltage for a load by switching a power switch by a controller receiving a supply voltage, an output voltage dependent signal from a feedback input, and a current sensing signal derived from a current flowing through the power switch, the controller turning off the power switch when the output voltage dependent signal is lower than the current sensing signal, the light-load efficiency improving method comprising the steps of:
   detecting the load and the supply voltage; and
   clamping the output voltage dependent signal when the load is detected lower than a first threshold value and the supply voltage is detected lower than a second threshold value, such that the supply voltage rises up until to reach a third threshold value.

4. The light-load efficiency improving method of claim 3, wherein the step of clamping the output voltage dependent signal comprises the step of replacing the output voltage dependent signal with a bias voltage.

5. A flyback converter comprising:
a power switch;
a controller for switching the power switch to convert an input voltage to an output voltage for a load, wherein the controller receives a supply voltage, an output voltage dependent signal from a feedback input, and a current sensing signal derived from a current flowing through the power switch; and
a light-load efficiency improving apparatus for selectively clamping the output voltage dependent signal by monitoring the load and the supply voltage.

6. The flyback converter of claim 5, wherein the light-load efficiency improving apparatus comprises:
a first detecting circuit for detecting the load;
a second detecting circuit for detecting the supply voltage; and
a circuit for providing a bias voltage to the feedback input according to outputs of the first detecting circuit and the second detecting circuit.

7. The flyback converter of claim 6, wherein the circuit for providing a bias voltage to the feedback input comprises:
a voltage source for providing the bias voltage; and
a switch between the voltage source and the feedback input for being turned on when the load is detected lower than a first threshold value and the supply voltage is detected lower than a second threshold value.

* * * * *